United States Patent
Han et al.

(10) Patent No.: US 10,746,370 B2
(45) Date of Patent: Aug. 18, 2020

(54) LAMP FOR VEHICLE HAVING FIRST AND SECOND LENS PORTIONS EACH WITH A PLURALITY OF LENSES ARRANGED IN HORIZONTAL DIRECTION INCLINED AT A PREDETERMINED ANGLE

(71) Applicant: SL Corporation, Daegu (KR)

(72) Inventors: Hyo Jin Han, Gyeongsan-si (KR); Joo Jin Chang, Gyeongsan-si (KR)

(73) Assignee: SL CORPORATION, Daegu (KR)

( * ) Notice: Subject to any disclaimer, the term of this patent is extended or adjusted under 35 U.S.C. 154(b) by 0 days.

(21) Appl. No.: 16/546,382

(22) Filed: Aug. 21, 2019

(65) Prior Publication Data

US 2020/0141553 A1 May 7, 2020

(30) Foreign Application Priority Data

Nov. 2, 2018 (KR) .......................... 10-2018-0133302

(51) Int. Cl.
| | |
|---|---|
| *F21S 41/43* | (2018.01) |
| *F21S 41/24* | (2018.01) |
| *F21S 41/275* | (2018.01) |
| *B60Q 1/04* | (2006.01) |

(52) U.S. Cl.
CPC .............. *F21S 41/43* (2018.01); *F21S 41/24* (2018.01); *F21S 41/275* (2018.01); *B60Q 1/04* (2013.01); *B60Q 2300/056* (2013.01)

(58) Field of Classification Search
CPC ........ F21S 41/275; F21S 41/43; F21S 41/265; F21S 41/285; B60Q 1/04; B60Q 2300/056; F21V 5/004
See application file for complete search history.

(56) References Cited

U.S. PATENT DOCUMENTS

| 10,591,126 B2 * | 3/2020 | Mandl ................... F21S 41/265 |
| 10,612,741 B2 | 4/2020 | Moser et al. |
| 2019/0263318 A1 | 8/2019 | Brill et al. |

FOREIGN PATENT DOCUMENTS

| DE | 102015121691 A1 | 6/2017 |
| DE | 102016221918 A1 | 5/2018 |
| KR | 20180111027 A | 10/2018 |
| WO | 2017066818 A1 | 4/2017 |
| WO | 2019110374 A1 | 6/2019 |

OTHER PUBLICATIONS

Extended European Search Report, European Patent No. EP 19195362, dated Feb. 26, 2020, 11 pages.

* cited by examiner

*Primary Examiner* — Robert J May
(74) *Attorney, Agent, or Firm* — Nelson Mullins Riley & Scarborough LLP; Kongsik Kim, Esq.

(57) ABSTRACT

A lamp for a vehicle capable of forming a beam pattern having a cutoff line to prevent glare to a driver of a vehicle in front is provided. The lamp for a vehicle includes a light source portion, a first lens portion including a plurality of incident lenses disposed on a surface on which light is incident from the light source portion, a second lens portion including a plurality of exit lenses disposed on a surface from which light incident from the first lens portion is emitted, and a shield portion disposed between the plurality of incident lens and the plurality of exit lenses. At least one of the plurality of incident lenses and at least one of the plurality of exit lenses, which are disposed in a horizontal direction to form horizontal rows, are arranged to allow the horizontal rows to be inclined at a predetermined angle.

16 Claims, 14 Drawing Sheets

LAMP FOR VEHICLE HAVING FIRST AND SECOND LENS PORTIONS EACH WITH A PLURALITY OF LENSES ARRANGED IN HORIZONTAL DIRECTION INCLINED AT A PREDETERMINED ANGLE

CROSS-REFERENCE TO RELATED APPLICATION

This application claims priority from Korean Patent Application No. 10-2018-0133302 filed on Nov. 2, 2018, and all the benefits accruing therefrom, which application is herein incorporated by reference in its entirety.

BACKGROUND

1. Technical Field

The present disclosure relates to a lamp for a vehicle, and more particularly to a lamp for a vehicle capable of forming a beam pattern having a cutoff line to prevent causing glare to a driver of a vehicle in front.

2. Description of the Related Art

Generally, a vehicle includes various types of vehicle lamps having an illumination function and a signaling function. The lighting function enables a driver to identify objects around the vehicle while driving in low light conditions (e.g., night). The signaling function is intended to inform other drivers or pedestrians about a driving state of the vehicle.

For example, a head lamp and a fog lamp are designed for the illumination function, and a turn signal lamp, a tail lamp, a brake lamp, and a side marker are designed for the signaling function. In addition, the installation standards and specifications for the vehicle lamps are legislated by regulations to allow the vehicle lamps to sufficiently fulfill their functions. Among the vehicle lamps, the head lamp, which forms various beam patterns such as a low beam pattern and a high beam pattern in order to secure the driver's forward visibility while driving in low light conditions, is important for safe driving. The low beam pattern is formed to have a predetermined cutoff line in order to prevent glare from blinding a driver of a vehicle in front, such as a preceding vehicle or an on-coming vehicle.

Recently, studies have been actively conducted to reduce the size of the vehicle lamp using a microlens having a relatively short focal length. In this case, when a low beam pattern is formed using a microlens, the low beam pattern is formed by light emitted from a plurality of microlenses. A plurality of shields are provided to form a cutoff line by obstructing a part of light incident on each of the plurality of microlenses. When a part of the light incident on each of the plurality of microlenses is obstructed by the plurality of shields, due to its relatively small size, light interference may occur between the shields adjacent to each other. In this case, an abnormal cutoff line may be formed, which increases the possibility of a vehicle accident.

Therefore, a technique capable of preventing light interference between the plurality of shields for obstructing a part of light incident on each of the plurality of microlenses is required.

SUMMARY

Aspects of the present disclosure provide a lamp for a vehicle in which a plurality of shields disposed in a horizontal direction to form a horizontal row may be arranged to allow the horizontal row to be inclined at a predetermined angle when forming a cutoff line including an inclined line, and an upper line and a lower line formed to have a height difference on both sides with respect to the inclined line through each of the plurality of shields.

Aspects of the present disclosure also provide a lamp for a vehicle in which, when a plurality of shields are arranged to allow a horizontal row to be inclined at a predetermined angle, incident lens and exit lens corresponding to the respective shields arranged in a horizontal direction may also be arranged to allow horizontal rows to be inclined at a predetermined angle.

Aspects of the present disclosure also provide a lamp for a vehicle in which an additional shield is disposed in front of each of a plurality of shields to allow an upper line and a lower line formed on both sides of an inclined line to be formed horizontally.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a lamp for a vehicle. The lamp may include a light source portion, a first lens portion including a plurality of incident lenses disposed on a surface on which light is incident from the light source portion, a second lens portion including a plurality of exit lenses disposed on a surface from which light incident from the first lens portion is emitted, and a shield portion disposed between the plurality of incident lenses and the plurality of exit lenses. In particular, at least one of the plurality of incident lenses and at least one of the plurality of exit lenses, which are disposed in a horizontal direction to form horizontal rows, may be arranged to allow the horizontal rows to be inclined at a predetermined angle.

According to the vehicle lamp of the present disclosure, at least one of the following effects may be obtained. Since a plurality of shields disposed in a horizontal direction to form a horizontal row are arranged to allow the horizontal row to be inclined at a predetermined angle, an abnormal (e.g., non-linear) cutoff line due to a height difference between the shields adjacent to each other in the horizontal direction may be prevented. Further, since an additional shield having an upper end disposed below the upper end of each of the plurality of shields is provided in front of each of the plurality of shields, the cutoff line may be formed horizontally.

The effects of the present disclosure are not limited to the above-described effects, and other effects which are not described herein will become apparent to those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
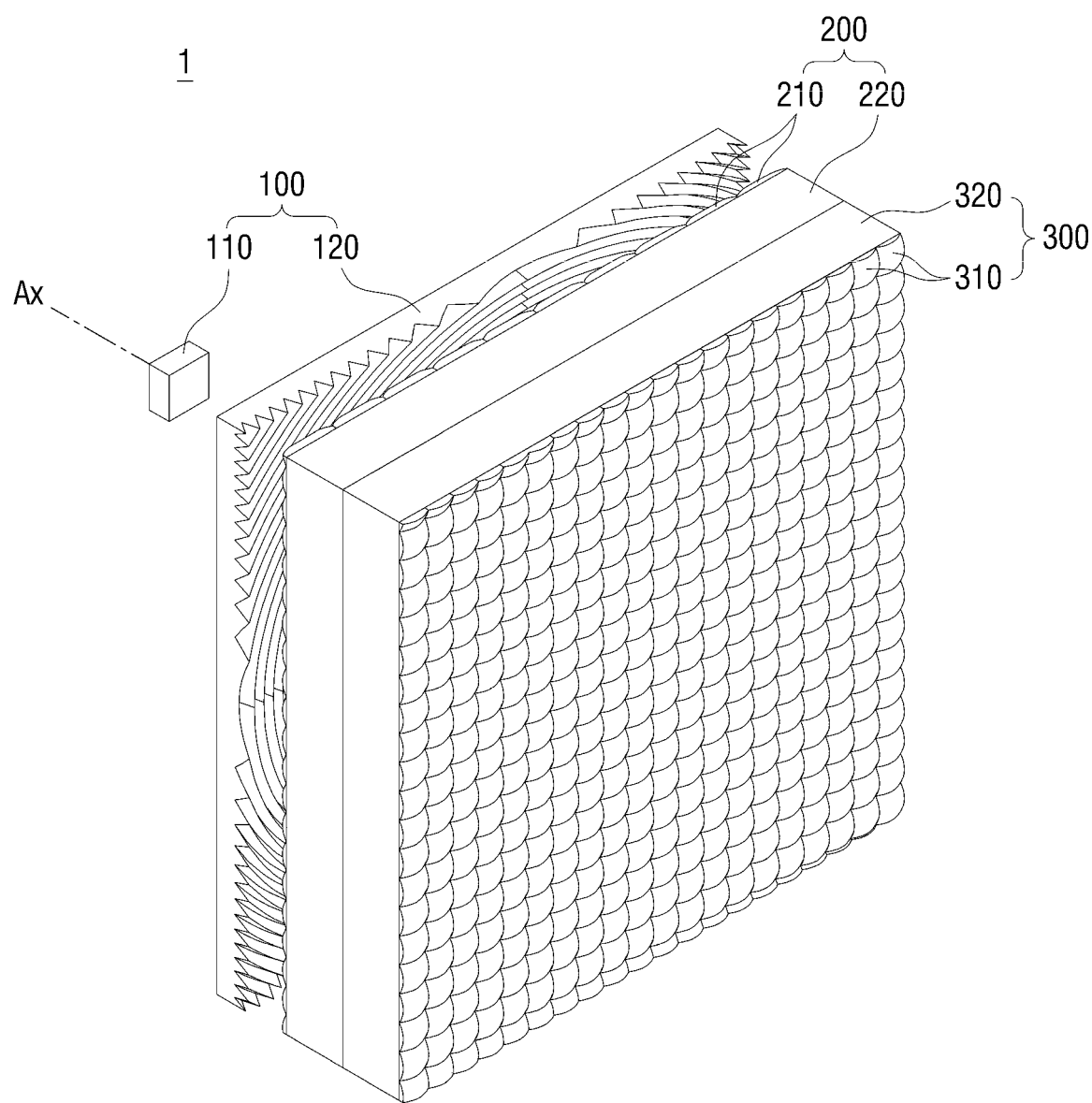
FIGS. 1 and 2 are perspective views showing a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements. In some embodiments, well-known steps, structures and techniques will not be described in detail to avoid obscuring the disclosure.

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-sectional illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, a lamp for a vehicle according to exemplary embodiments of the present disclosure will be described with reference to the drawings.

Figure 2:
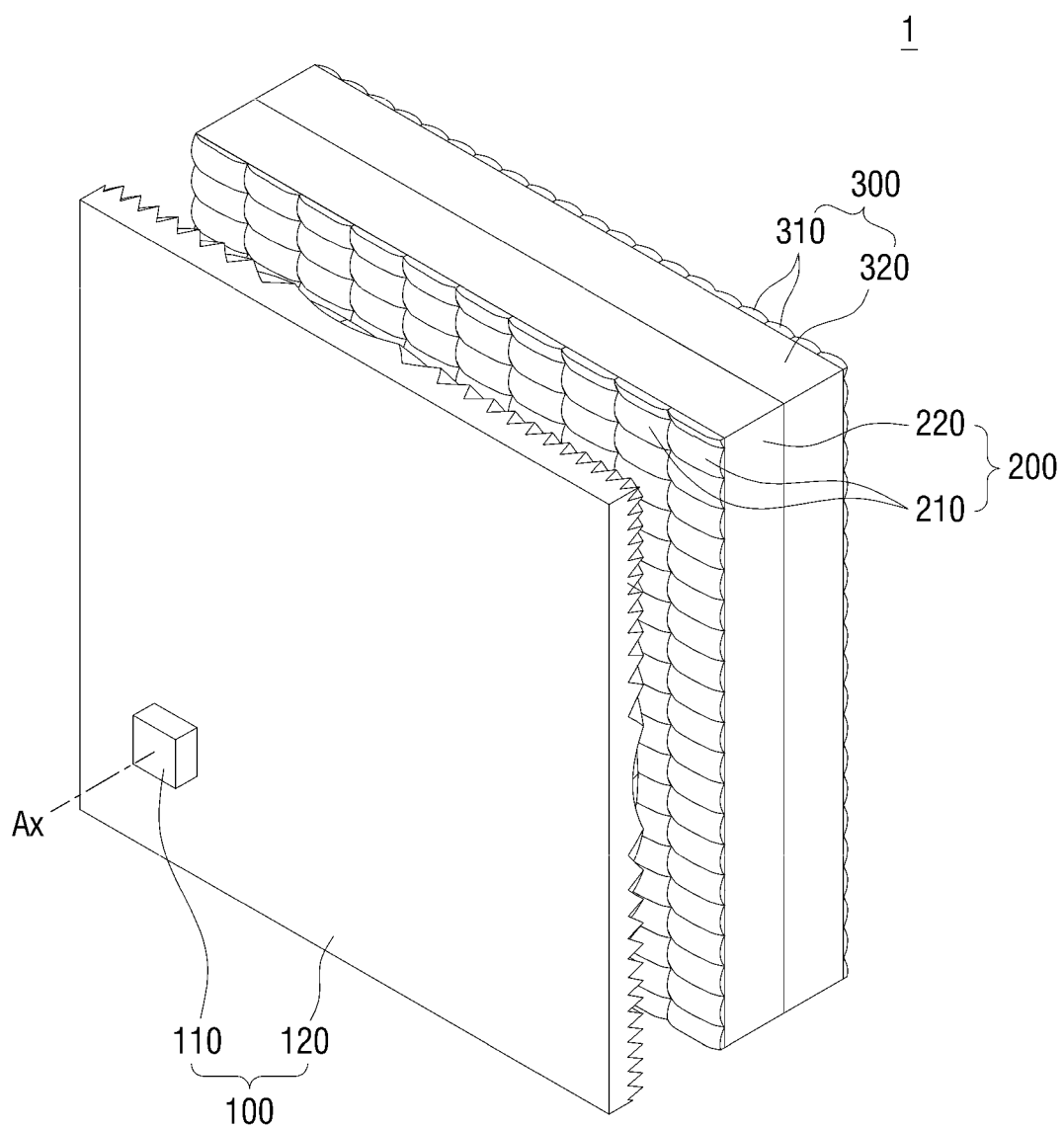
Figure 3:
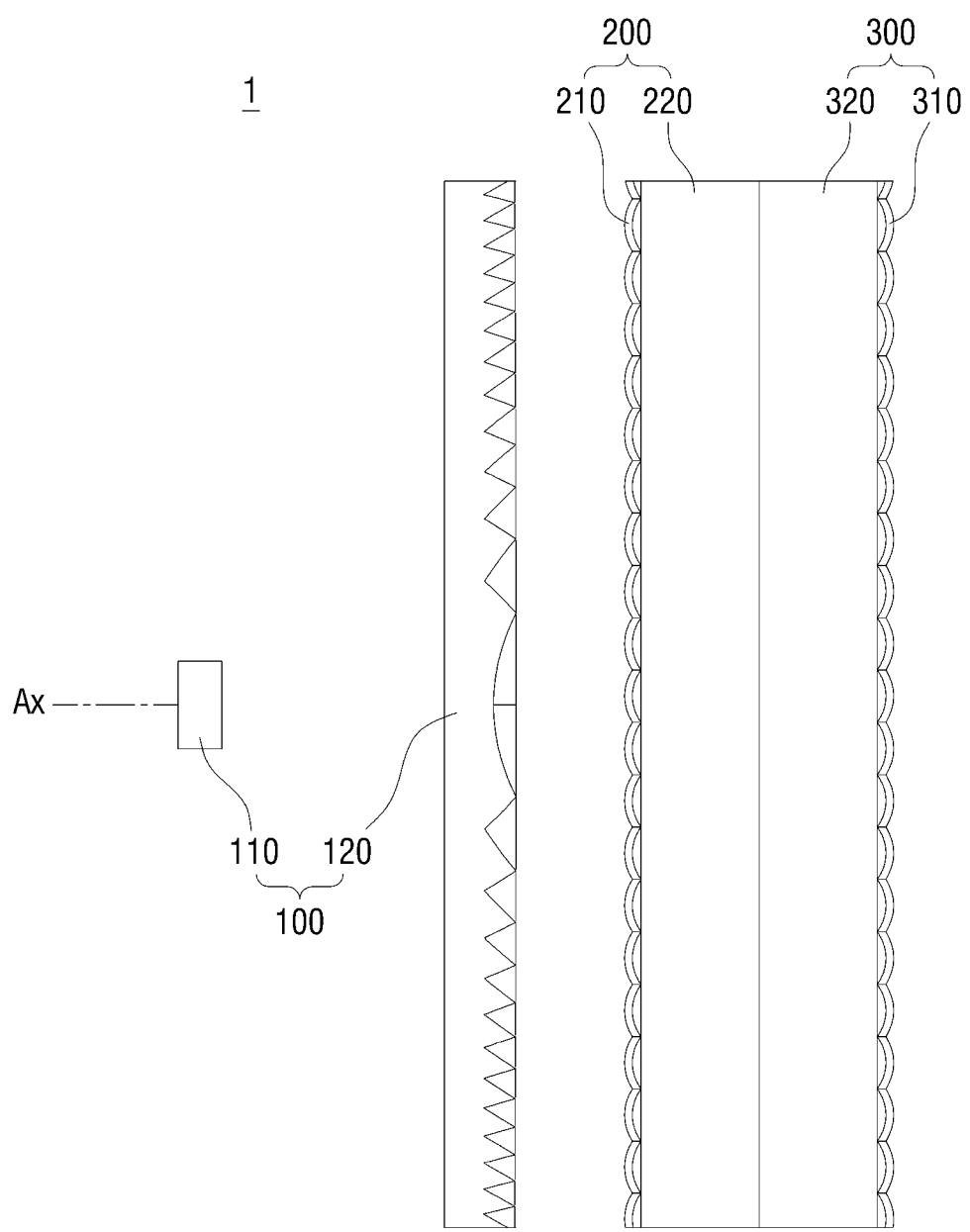
FIG. 3 is a side view showing the vehicle lamp according to the exemplary embodiment of the present disclosure.
Figure 4:
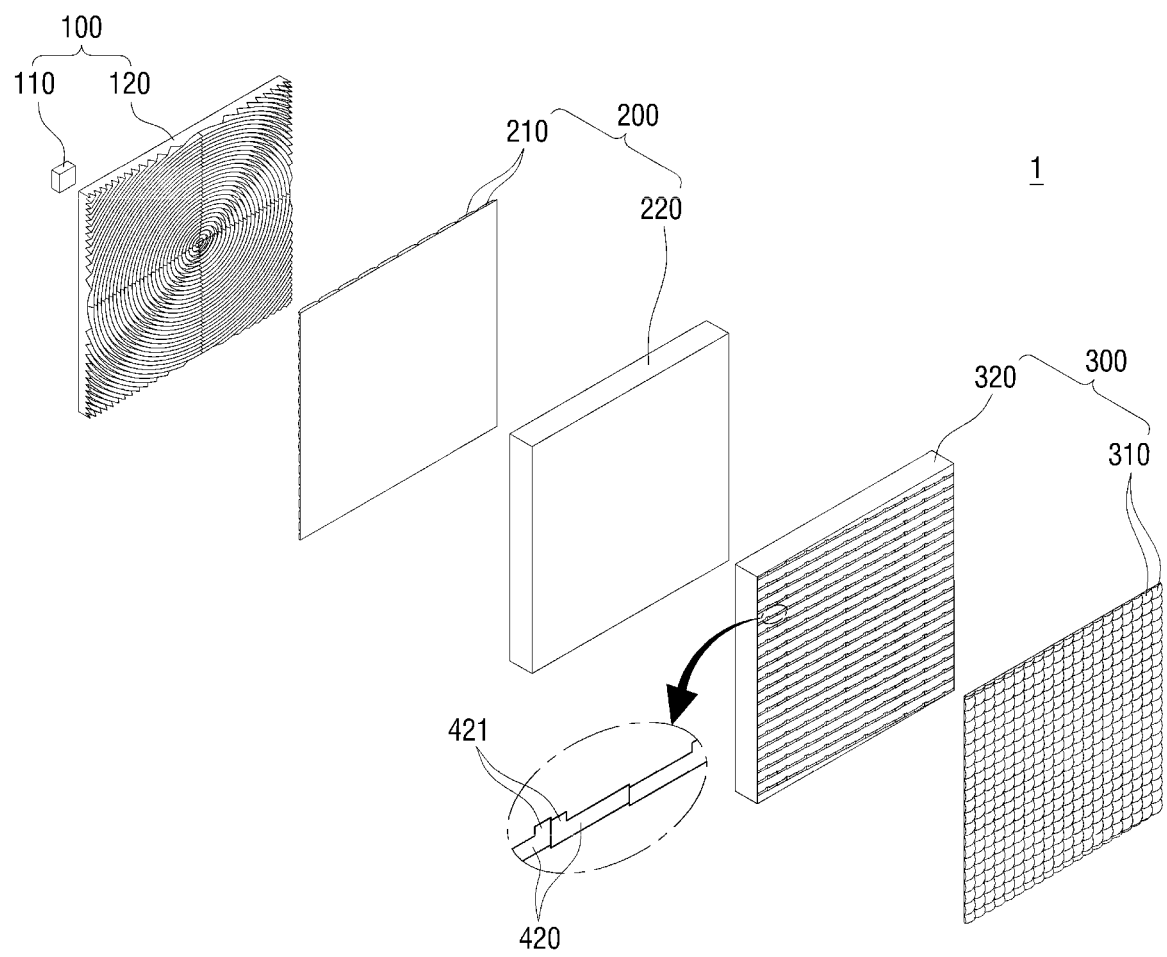
FIGS. 4 and 5 are exploded perspective views illustrating the vehicle lamp according to the exemplary embodiment of the present disclosure.
Figure 5:
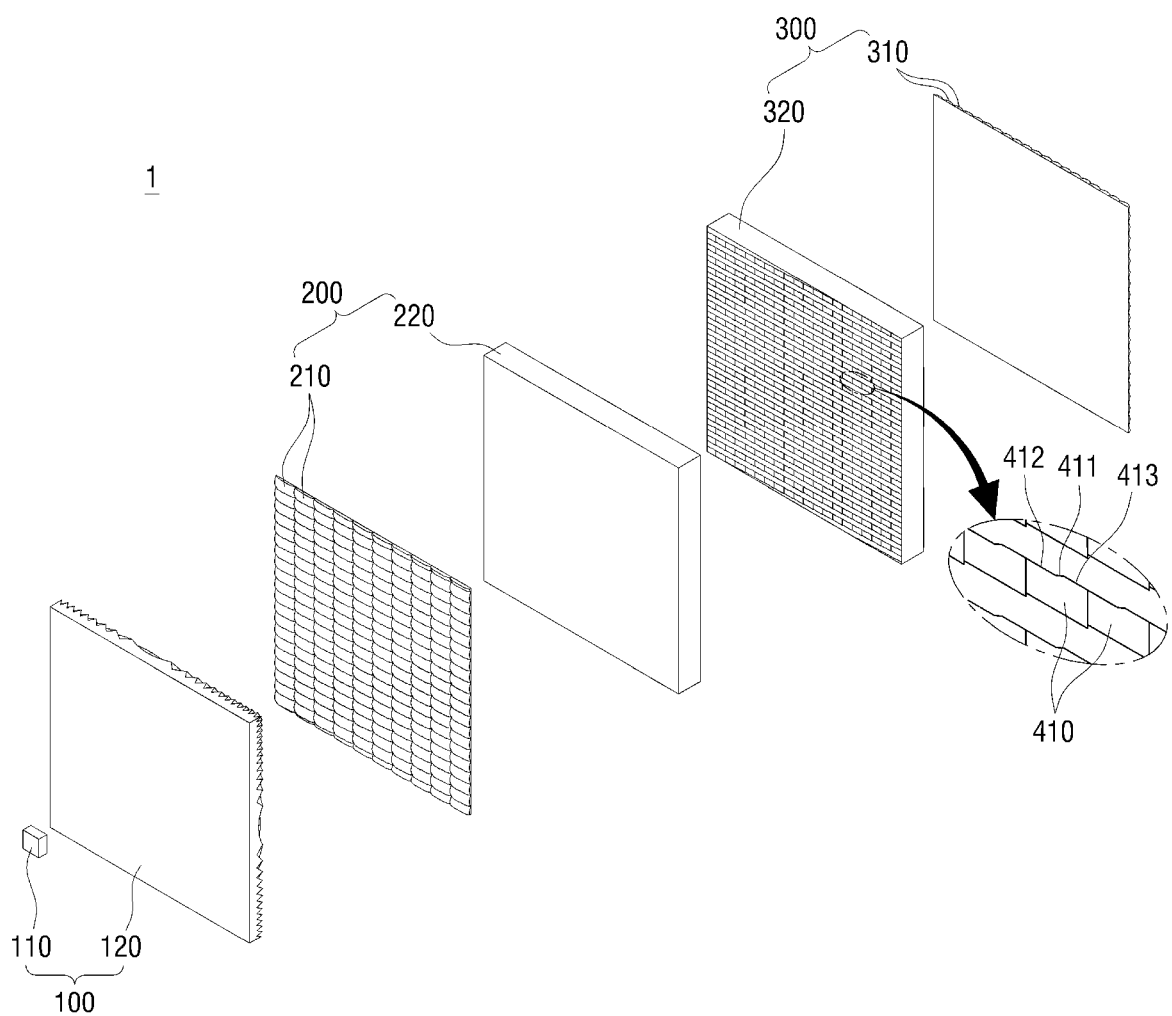

FIGS. 1 and 2 are perspective views showing a vehicle lamp according to an exemplary embodiment of the present disclosure. FIG. 3 is a side view of the vehicle lamp according to the exemplary embodiment of the present disclosure. FIGS. 4 and 5 are exploded perspective views showing the vehicle lamp according to the exemplary embodiment of the present disclosure. Referring to FIGS. 1 to 5, a vehicle lamp 1 according to an exemplary embodiment of the present disclosure may include a light source portion 100, a first lens portion 200, a second lens portion 300, and a shield portion 400.

In the exemplary embodiment of the present disclosure, the vehicle lamp 1 may be used as a head lamp for securing a forward visibility by irradiating light in a forward direction of the vehicle when the vehicle travels in low light conditions (e.g., at night or in a tunnel). However, the present disclosure is not limited thereto, the vehicle lamp 1 of the present disclosure may be used as various lamps installed in a vehicle, such as a tail lamp, a brake lamp, a fog lamp, a position lamp, a turn signal lamp, a daytime running light lamp, and a back-up lamp, in addition to the head lamp.

Further, in the exemplary embodiment of the present disclosure, when the vehicle lamp 1 is used as a head lamp, a low beam pattern may be formed to prevent light from irradiating on the upper side with respect to a predetermined cutoff line, and thereby to prevent glare that may blind a driver of a vehicle in front, such as a preceding vehicle or an on-coming vehicle in the opposite lane. However, this is merely an example to facilitate understanding of the present disclosure, and it is not intended to limit the present disclosure to the illustrated exemplary embodiment. The vehicle lamp 1 of the present disclosure may form various beam patterns depending on the intended use and may form two or more beam patterns simultaneously.

The light source portion 100 may include a light source 110 and a light guide portion 120. In the exemplary embodiment of the present disclosure, a semiconductor light emitting element such as an LED may be used as the light source 110. However, the present disclosure is not limited thereto, and various types of light sources such as a bulb as well as the semiconductor light emitting element may be used as the light source 110. A component such as a reflector for reflecting the light generated from the light source 110 to the first lens portion 200 depending on the type of the light source 110 may be additionally used.

The light guide portion 120 may adjust an optical path of the light generated at a predetermined light irradiation angle from the light source 110 to be parallel to an optical axis Ax of the light source 110, thereby guiding the light to the first lens portion 200. In this case, the optical axis Ax of the light source 110 may be a line that perpendicularly passes through the center of the light emitting surface of the light source 110, and the optical axis of the light source portion 100 may be the optical axis Ax of the light source 110.

The light guide portion 120 may serve to reduce light loss by allowing a maximum amount of the light generated from the light source 110 to be incident on the first lens portion 200 and to adjust an optical path of the light incident on the first lens portion 200 to be parallel to the optical axis Ax of the light source 110 to allow the light to be uniformly incident on the first lens portion 200 overall. In the exemplary embodiment of the present disclosure, a Fresnel lens including a plurality of annular lenses may be used as the light guide portion 120 to adjust the optical path of the light generated from the light source 110 to be parallel to the optical axis Ax of the light source 110 while reducing the thickness. However, the present disclosure is not limited thereto, and various types of lenses capable of adjusting the optical path of light generated from the light source 110, such as a collimator lens, may be used as the light guide portion 120.

Meanwhile, in the exemplary embodiment of the present disclosure, the light generated from the light source 110 may be adjusted to a parallel light by the light guide portion 120 and guided to the first lens portion 200. However, the light guide portion 120 may be omitted, for example, depending on the type and/or number of the light sources 110.

The first lens portion 200 may be disposed in front of the light source portion 100 (e.g., adjacent to the light source portion 100 along the direction of the optical axis Ax) and may serve to emit the light incident from the light source portion 100 to the second lens portion 300 disposed in front of the first lens portion 200. The first lens portion 200 may include a plurality of incident lenses 210 through which the light generated from the light source portion 100 is incident, and the incident surfaces of the plurality of incident lenses 210 may form the incident surface of the first lens portion 200.

In the exemplary embodiment of the present disclosure, each of the plurality of incident lenses 210 may be a microlens having a relatively short focal length to reduce the overall size of the vehicle lamp 1 of the present disclosure. In this case, when the first lens portion 200 is disposed in front of the light source portion 100, it may be assumed that a direction in which light is irradiated from the vehicle lamp 1 of the present disclosure is a forward direction. However, the forward direction may vary depending on the position and/or direction in which the vehicle lamp 1 of the present disclosure is installed.

The plurality of incident lenses 210 are disposed on a surface of a first light transmitting portion 220 that faces the light source portion 100, and the first light transmitting portion 220 may be made of a material through which light is transmitted. The plurality of incident lenses 210 may be formed integrally with the first light transmitting portion 220, or may be formed separately from the first light transmitting portion 220 and may be disposed and/or coupled on the surface of the first light transmitting portion 220 that faces the light source portion 100.

In the exemplary embodiment of the present disclosure, each of the plurality of incident lenses 210 may be a semi-cylindrical lens that is elongated in a horizontal direction. At least one of the incident lenses 210 arranged in the horizontal direction may form a horizontal row, and the horizontal rows may be arranged in a vertical direction to form the incident surface of the first lens portion 200. The plurality of incident lenses 210 may be arranged to allow the horizontal rows to be inclined at a predetermined angle. Accordingly, the cutoff line of the beam pattern formed by the vehicle lamp 1 of the present disclosure may be formed at an appropriate position. A detailed description thereof will be given below.

Figure 6:
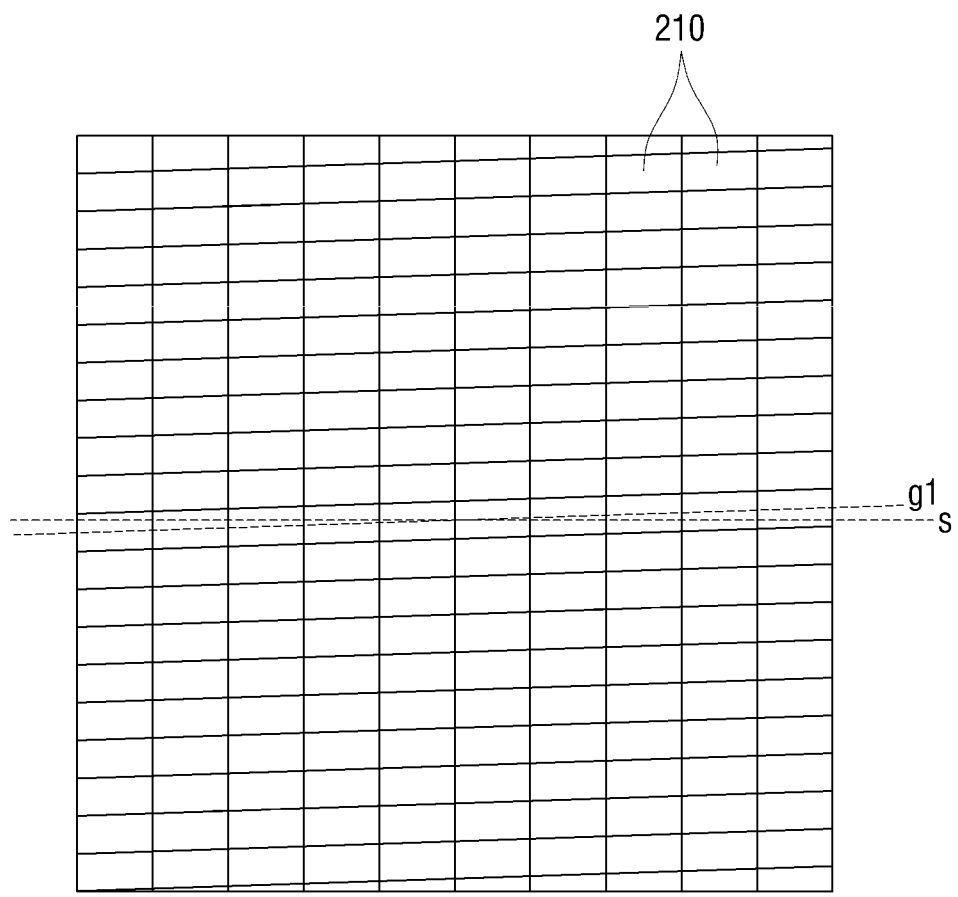
FIGS. 6 and 7 are schematic views illustrating a plurality of incident lenses according to the exemplary embodiment of the present disclosure.
Figure 7:
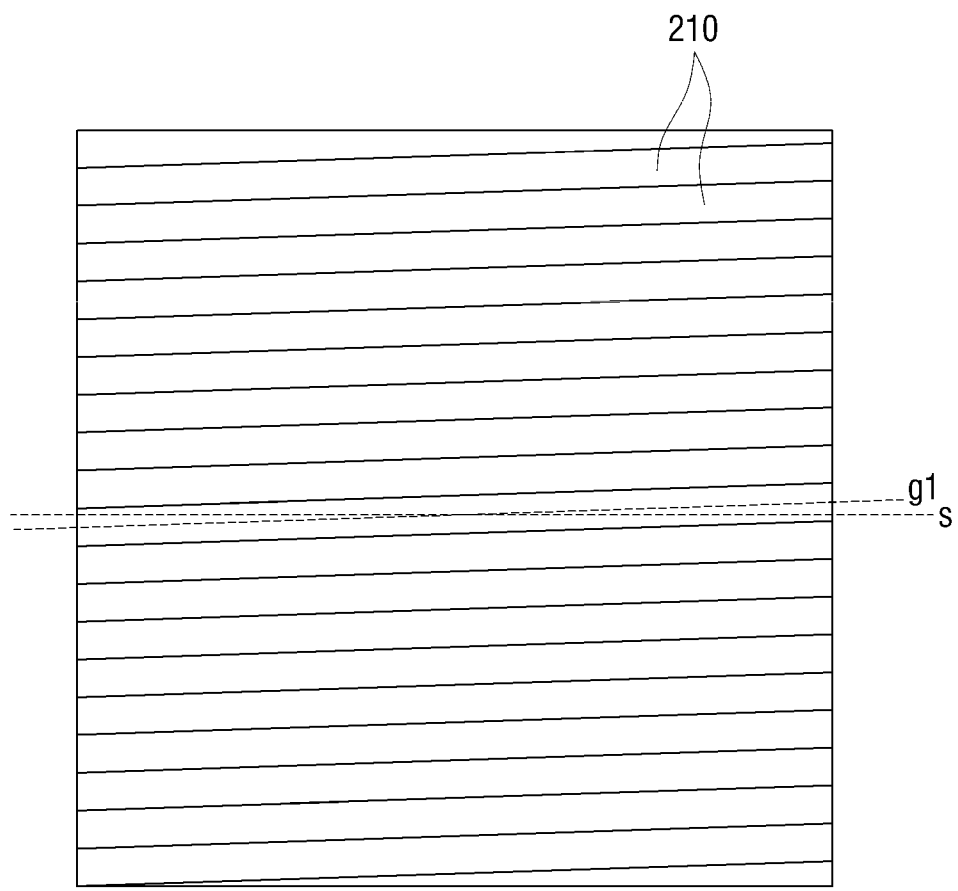

The description that the plurality of incident lenses 210 are arranged to allow the horizontal rows to be inclined at a predetermined angle may mean that, as shown in FIG. 6, the plurality of incident lenses 210 are arranged to dispose an imaginary line g1 that connects specific points (e.g., centers) of the incident lens in the horizontal direction to be inclined and have a predetermined angle with respect to a horizontal line s. Although FIG. 6 illustrates that a plurality of incident lenses arranged in the horizontal direction forms a horizontal row, the present disclosure is not limited thereto. As shown in FIG. 7, a single incident lens that extends in the horizontal direction may form a horizontal row. In this case, similarly to the case of FIG. 6, the horizontal row may be extended to be inclined at a predetermined angle.

In the exemplary embodiment of the present disclosure, semi-cylindrical lenses which are elongated in the horizontal direction may be used as the plurality of incident lenses 210. Accordingly, the light emitted from the vehicle lamp 1 may be spread to a relatively wider angle, thereby improving the spread characteristic of the beam pattern. Based on the required spread characteristic, the length and number of incident lenses arranged in the horizontal direction may be varied. For example, the case of FIG. 7 may allow the light to be spread in a relatively wider angle in comparison with the case of FIG. 6. The plurality of incident lenses 210 may have various lengths based on the required spread characteristic. Further, when various spread characteristics are required, a plurality of vehicle lamps 1 that includes a plurality of incident lenses 210 having different lengths may be used.

The second lens portion 300 may include a plurality of exit lenses 310 for emitting the light incident from the first lens portion 200. The exit surfaces of the plurality of exit lenses 310 may form the exit surface of the second lens portion 300. The plurality of exit lenses 310 may be disposed on a surface of a second light transmitting portion 320, from which light is emitted, and the second light transmitting portion 320 may be made of a material through which light is transmitted. The plurality of exit lenses 310 may be formed integrally with the second light transmitting portion 320, or may be formed separately from the second light transmitting portion 320 and disposed and/or coupled on the surface of the second light transmitting portion 320, from which light is emitted.

In the exemplary embodiment of the present disclosure, the first light transmitting portion 220 and the second light transmitting portion 320 may be disposed to allow their facing surfaces to abut (e.g., in contact with) each other. However, the present disclosure is not limited thereto, and the first light transmitting portion 220 and the second light transmitting portion 320 may be spaced apart from each other by a predetermined distance in order to diffuse light. In this case, in the exemplary embodiment of the present disclosure, each of the plurality of incident lenses 210 may be a semi-cylindrical lens that is elongated in the horizontal direction. Accordingly, the light emitted from one of the plurality of incident lenses 210 may be incident on a plurality of exit lenses arranged in the extending direction of the semi-cylindrical lens of the plurality of exit lenses 310. In the exemplary embodiment of the present disclosure, a case where light emitted from each of the plurality of incident lenses 210 is incident on at least two exit lenses of the plurality of exit lenses 310 will be described as an example.

In the exemplary embodiment of the present disclosure, at least two exit lenses of the plurality of exit lenses 310 may correspond to one of the plurality of incident lenses 210. However, the present disclosure is not limited thereto, and the plurality of incident lenses 210 and the plurality of exit lenses 310 may correspond to each other on a one-to-one, one-to-many, many-to-one, or many-to-many basis.

The light emitted from each of the plurality of incident lenses 210 may be incident on at least two exit lenses of the plurality of exit lenses 310 in order to improve the spread characteristic of the beam pattern formed by the vehicle lamp 1 of the present disclosure as described above. In this case, similarly to the plurality of incident lenses 210, at least one of the exit lenses 310 arranged in the horizontal direction may form a horizontal row, and the horizontal rows may be arranged in the vertical direction to form the exit surface of the second lens portion 300.

Further, the plurality of exit lenses 310 may be arranged to allow the horizontal rows to be inclined at a predetermined angle. Accordingly, the cutoff line of the beam pattern formed by the vehicle lamp 1 of the present disclosure may be formed at an appropriate position. A detailed description thereof will be given later.

Figure 8:
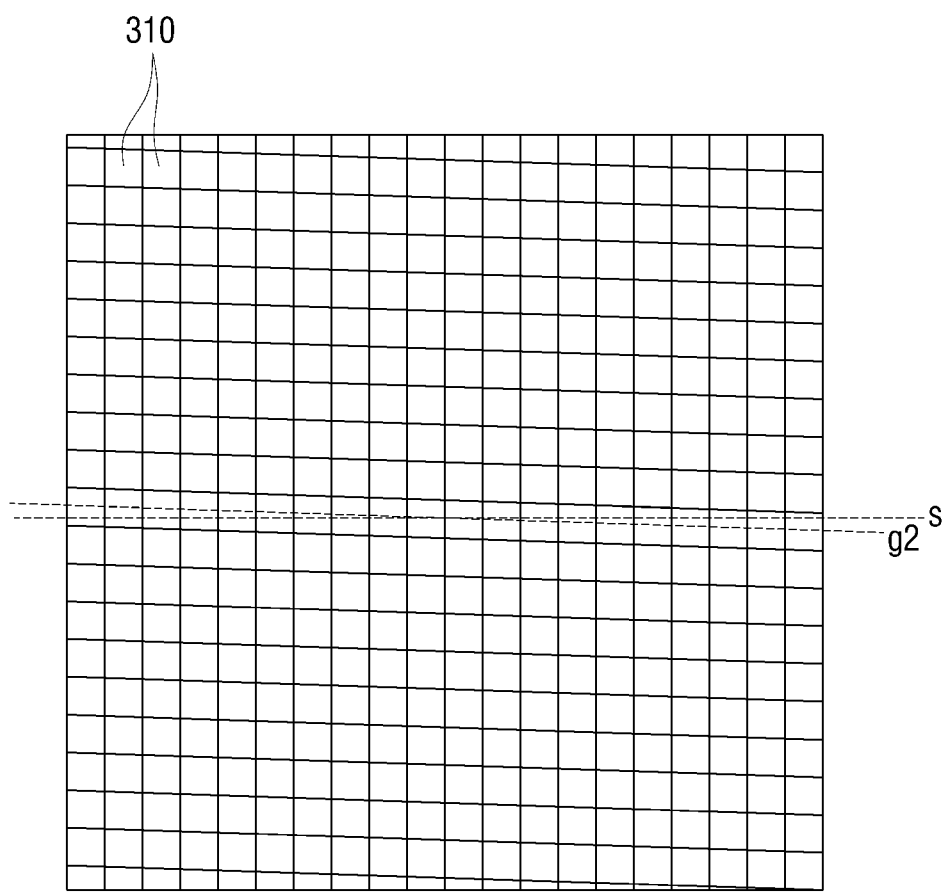
FIG. 8 is a schematic view showing a plurality of exit lenses according to the exemplary embodiment of the present disclosure.

The description that the plurality of exit lenses 310 are arranged to allow the horizontal rows to be inclined at a predetermined angle may mean that, similarly to the plurality of incident lenses 210, as shown in FIG. 8, the plurality of exit lenses 310 are arranged to dispose an imaginary line g2 that connects specific points (e.g., centers) of the exit lenses disposed in the horizontal direction to be inclined and have a certain angle with respect to the horizontal line s.

In this case, FIGS. 6 and 7 illustrate that the plurality of incident lenses 210 may be arranged to allow the horizontal rows to be inclined at a predetermined angle when viewing the first lens portion 200 from the rear of the first lens portion 200 along the direction of the optical axis Ax of the light source 110. FIG. 8 illustrates that the plurality of exit lenses 310 may be arranged to allow the horizontal rows to be inclined at a predetermined angle when viewing the second lens portion 300 from the front of the second lens portion 300 along the direction of the optical axis Ax of the light source 110. Accordingly, the plurality of incident lenses 210 and the plurality of exit lenses 310 may be arranged to allow the horizontal rows to be inclined at a predetermined angle in the same direction with respect to the horizontal line s.

Figure 9:
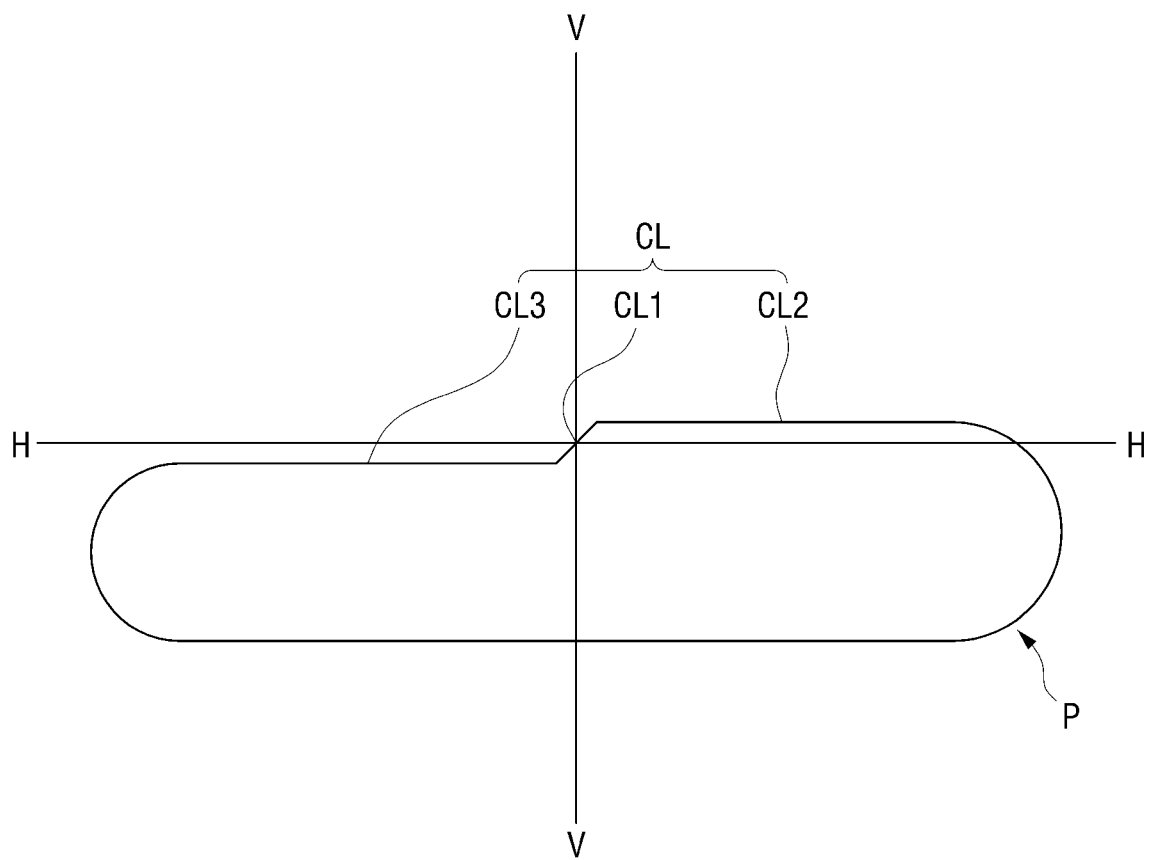
FIG. 9 is a schematic view showing a beam pattern formed by the vehicle lamp according to the exemplary embodiment of the present disclosure.

The shield portion 400 may be disposed between the plurality of incident lenses 210 and the plurality of exit lenses 310 to obstruct a part of the light incident on the plurality of exit lenses 310 to form a cutoff line CL of a low beam pattern P as shown in FIG. 9. The cutoff line CL of the low beam pattern P may include an inclined line CL1, an upper line CL2 that corresponds to the driving lane, and a lower line CL3 that corresponds to the opposite lane. The low beam pattern P of FIG. 9 is an example of a beam pattern formed by irradiating light onto a screen disposed at a predetermined distance in front of the vehicle from the vehicle lamp 1 of the present disclosure.

The shield unit 400 may include a plurality of first shields 410 and a plurality of second shields 420 formed on one of the first light transmitting unit 220 and the second light transmitting unit 320. In the exemplary embodiment of the present disclosure, the plurality of first shields 410 may be formed on the incident surface (i.e., the surface that faces the first lens portion 200) of the second light transmitting portion 320, and the plurality of second shields 420 may be formed on the exit surface (i.e., the surface that faces the front side) of the second light transmitting portion 320.

In the exemplary embodiment of the present disclosure, the plurality of first shields 410 and the plurality of second shields 420 may be formed on both surfaces of the second light transmitting portion 320 by vapor deposition or coating. However, this is merely an example to facilitate understanding of the present disclosure, and it is not intended to limit the present disclosure to the illustrated exemplary embodiment. The plurality of first shields 410 and the plurality of second shields 420 may be formed in a film form and attached to both surfaces of the second light transmitting portion 320.

Each of the plurality of first shields 410 may obstruct a part of light incident on each of the plurality of exit lenses 310 to form the cutoff line CL of FIG. 8. At the upper end of each of the plurality of first shields 410, as shown in FIG. 5, an inclined edge portion 411 that forms the inclined line CL1, a first edge portion 412 that forms the upper line CL2, and a second edge portion 413 that forms the lower line CL3 may be included. In this case, the positions of the first edge portion 412 and the second edge portion 413 may be opposite to the positions of the upper line CL2 and the lower line CL3 since the light incident on the plurality of exit lenses 310 and the light emitted from the plurality of exit lenses 310 have inverted phases when aspheric lenses are used as the plurality of exit lenses 310. Accordingly, since the first edge portion 412 is formed to have a height of the lower end of the inclined edge portion 411, and the second edge portion 413 is formed to have a height of the upper end of the inclined edge portion 411, they may have a height difference.

Figure 10:
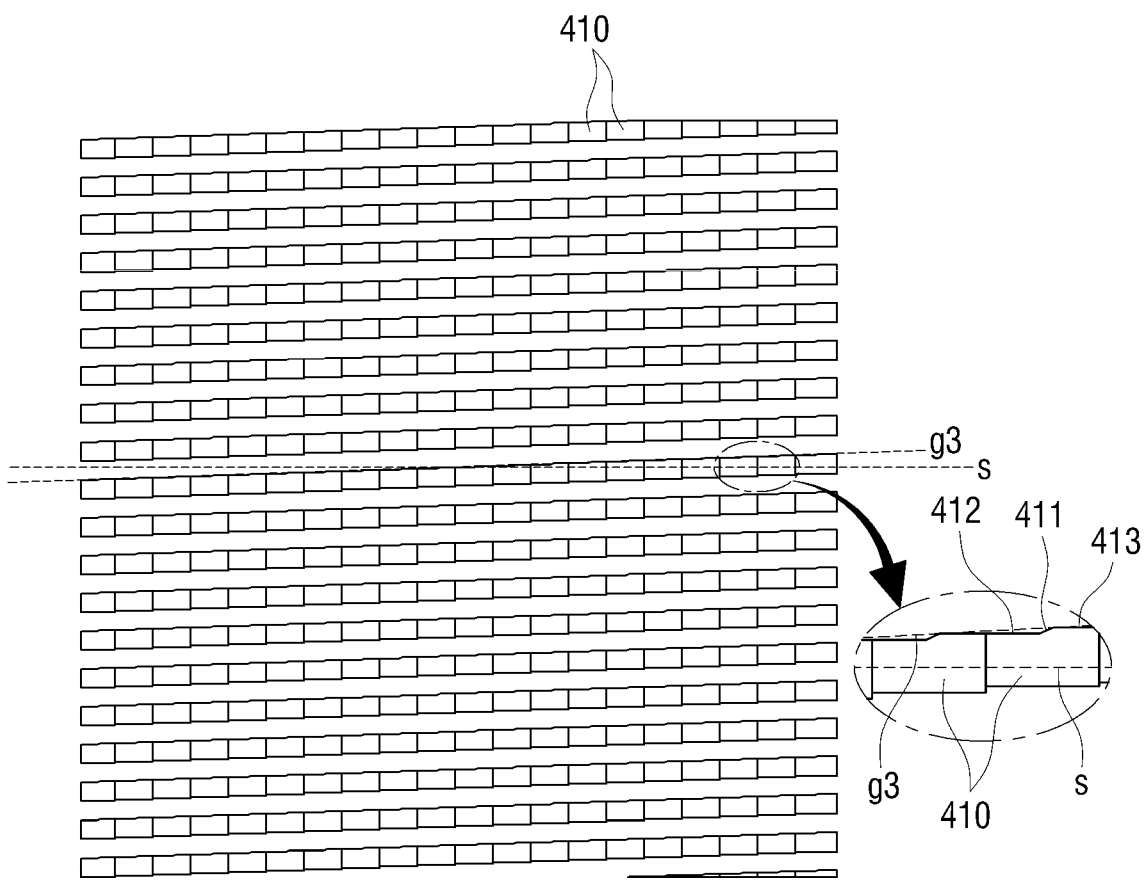
FIG. 10 is a schematic view showing a plurality of first shields according to the exemplary embodiment of the present disclosure.

The plurality of first shields 410 may be arranged to form a horizontal row, and the horizontal rows may be arranged in the vertical direction. As shown in FIG. 10, the horizontal rows may be arranged to be inclined at a predetermined angle. FIG. 10 shows a shape when the plurality of first shields 410 are viewed from the rear of the second lens portion 300. As described above, the plurality of first shields 410 may be arranged to allow the horizontal rows to be inclined at a predetermined angle since the second edge portion and the first edge portion of the adjacent first shields on both sides of the first edge portion 412 and the second edge portion 413 of one of the plurality of first shields 410 may be disposed to have the same height.

Further, the description that the plurality of first shields 410 are arranged to allow the horizontal rows to be inclined at a predetermined angle may mean that the plurality of first shields 410 are arranged to dispose an imaginary line g3 that connects specific points (e.g., upper ends of the inclined edge portions 411) of the first shields 410 to be inclined and have a predetermined angle with respect to the horizontal line s.

As described above, the plurality of first shields 410 may be arranged to allow the horizontal rows to be inclined at a predetermined angle in order to prevent an abnormal line from being formed on both sides of the cutoff line CL when the plurality of first shields 410 are arranged horizontally in the horizontal direction. In other words, when the plurality of first shields 410 are arranged such that the horizontal rows are horizontal, a height difference may occur between the second edge portion and the first edge portion of the adjacent first shields on both sides of the first edge portion 412 and the second edge portion 413 of one of the plurality of first shields 410. Due to the height difference, a portion lower than the upper line CL2 and a portion higher than the lower line CL3 may be formed at both sides of the cutoff line CL, which may cause a discomfort to a driver. Further, it may reduce the driver's visibility and/or cause glare to the driver of the vehicle ahead.

Figure 11:
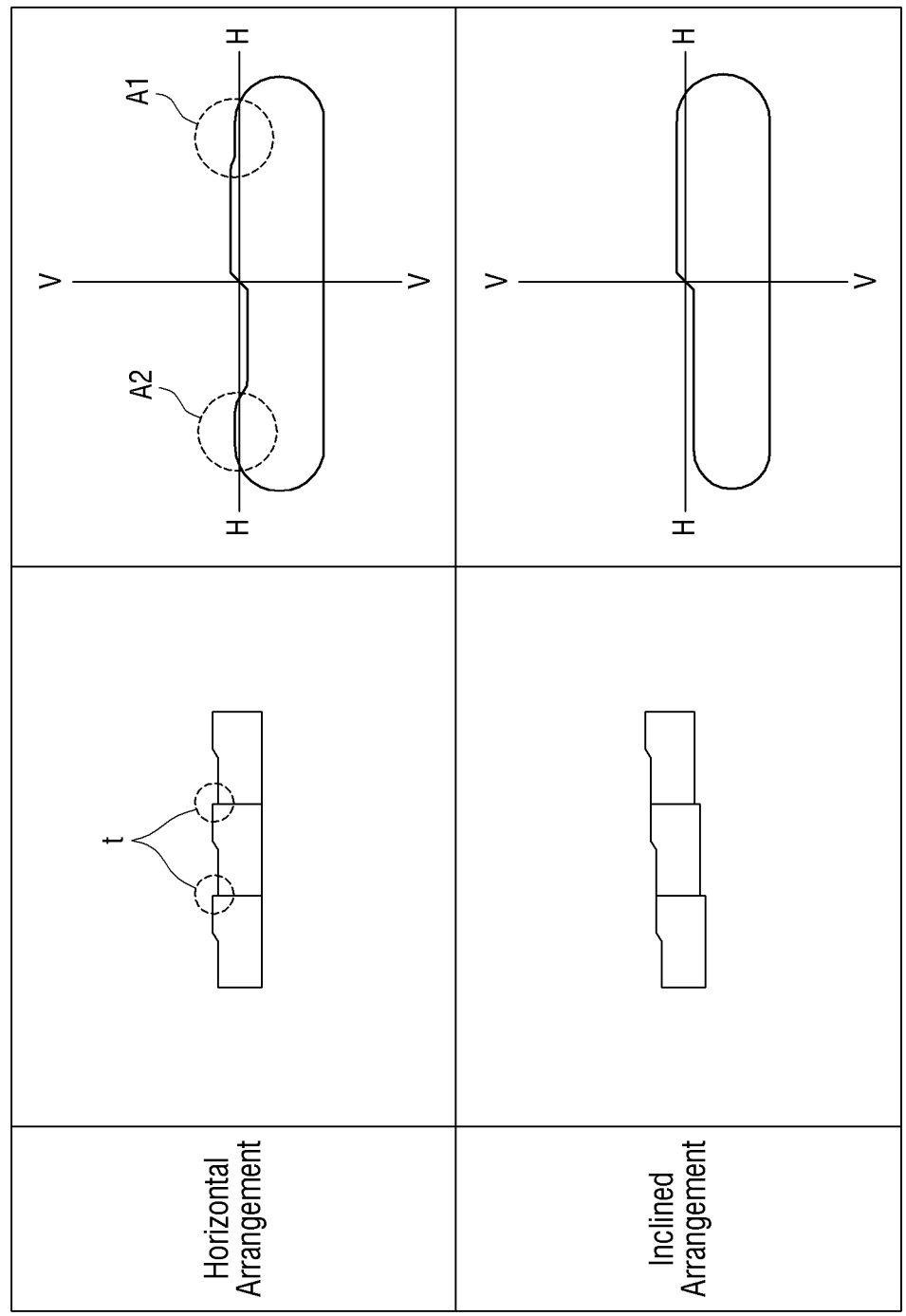
FIG. 11 is a schematic view showing a beam pattern according to the arrangement of a plurality of first shields according to the exemplary embodiment of the present disclosure.
Figure 12:
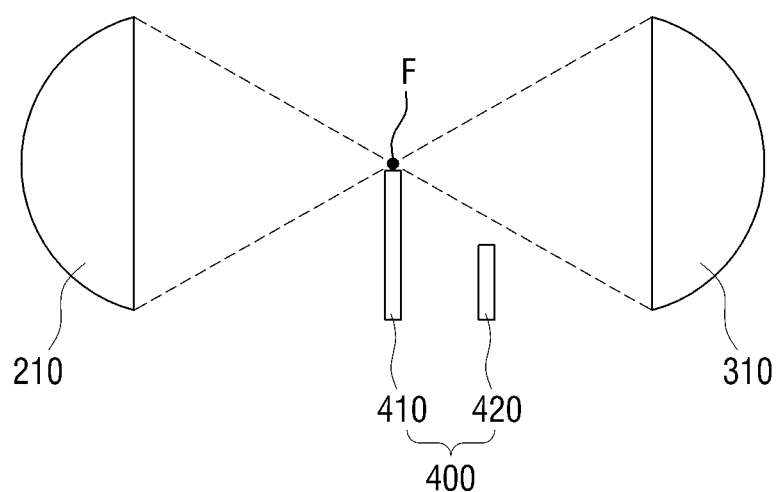
FIG. 12 is a schematic view showing a first shield and a second shield disposed between an incident lens and an exit lens according to the exemplary embodiment of the present disclosure.

In other words, as shown in FIG. 11, when the plurality of first shields 410 are arranged such that the horizontal rows are horizontal, since a height difference t occurs between the first shields 410 adjacent to each other in the horizontal direction, an area A1 lower than the upper line CL2 and an area A2 higher than the lower line CL3 are formed on both sides of the cutoff line CL of the low beam pattern P. On the other hand, in the exemplary embodiment of the present disclosure, since the plurality of first shields 410 are arranged such that the horizontal rows are inclined at a predetermined angle, no height difference occurs between the first shields 410 adjacent to each other in the horizontal direction. Accordingly, the area A1 lower than the upper line CL2 and the area A2 higher than the lower line CL3 may be prevented from appearing on both sides of the cutoff line CL of the low beam pattern P.

In this case, when the second edge portion and the first edge portion of the adjacent first shields on both sides of the first edge portion 412 and the second edge portion 413 of one of the plurality of first shields 410 are formed to have the same height, the position of the focus may be adjusted in comparison with a case where the plurality of first shields 410 are arranged such that the horizontal rows are horizontal. Accordingly, the plurality of incident lenses 210 and the plurality of exit lenses 310 may be also arranged such that the horizontal rows are inclined at a predetermined angle.

In particular, assuming that the position of the focus by each of the plurality of first shields 410 is the upper end of the inclined edge portion 411, the upper end of each of the plurality of first shields 410 may be disposed at or near a rear focal point F of each of the plurality of exit lenses 310. When the second edge portion and the first edge portion of the adjacent first shields on both sides of the first edge portion 412 and the second edge portion 413 of one of the plurality of first shields 410 are formed to have the same height, the imaginary line g3 that connects the upper ends of the inclined edge portions 411 of the plurality of first shields 410 may be inclined upward at a predetermined angle in a direction from the first edge portion 412 to the second edge portion 413 of each of the plurality of first shields 410 with respect to the horizontal line. Thus, based on the position of the focus, the plurality of incident lenses 210 and the plurality of exit lenses 310 may also be arranged to allow the horizontal rows to be inclined at a predetermined angle.

Figure 13:
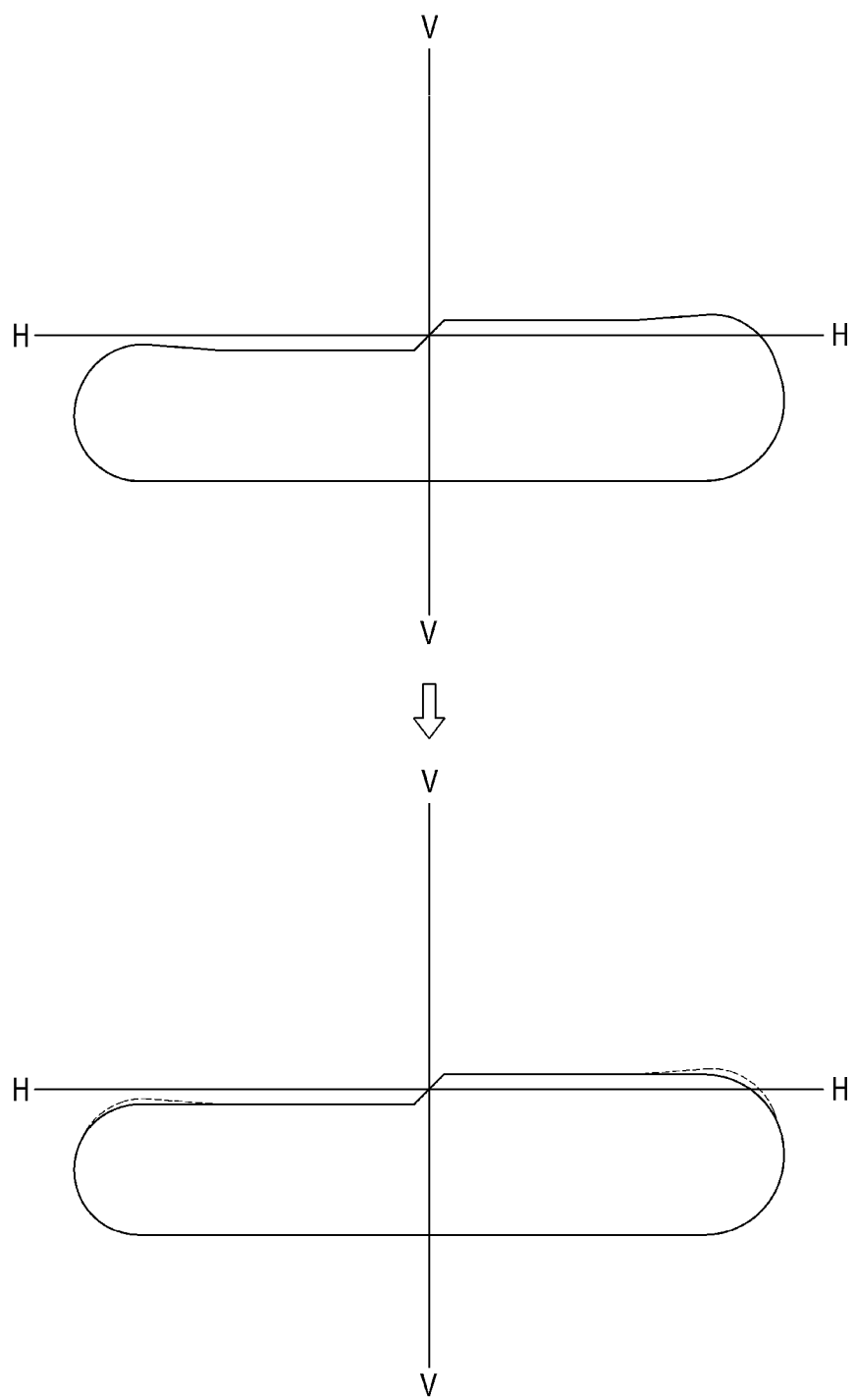
FIG. 13 is a schematic view showing a beam pattern formed by a plurality of second shields according to the exemplary embodiment of the present disclosure.

The plurality of second shields 420 may include the upper line CL2 and the lower line CL3 of the cutoff line CL that are formed horizontally. The upper line CL2 and the lower line CL3 of the cutoff line CL may be mainly formed by the light emitted from the lower portion of the plurality of exit lenses 310. As shown in FIG. 13, the upper line CL2 and the lower line CL3 may be formed horizontally by obstructing a part of the light incident on the lower portion of the plurality of exit lenses 310 in comparison with a beam pattern (indicated by a dotted line) when the plurality of second shields 420 are omitted. Accordingly, the above-described beam pattern as shown in FIG. 8 may be formed.

Figure 14:
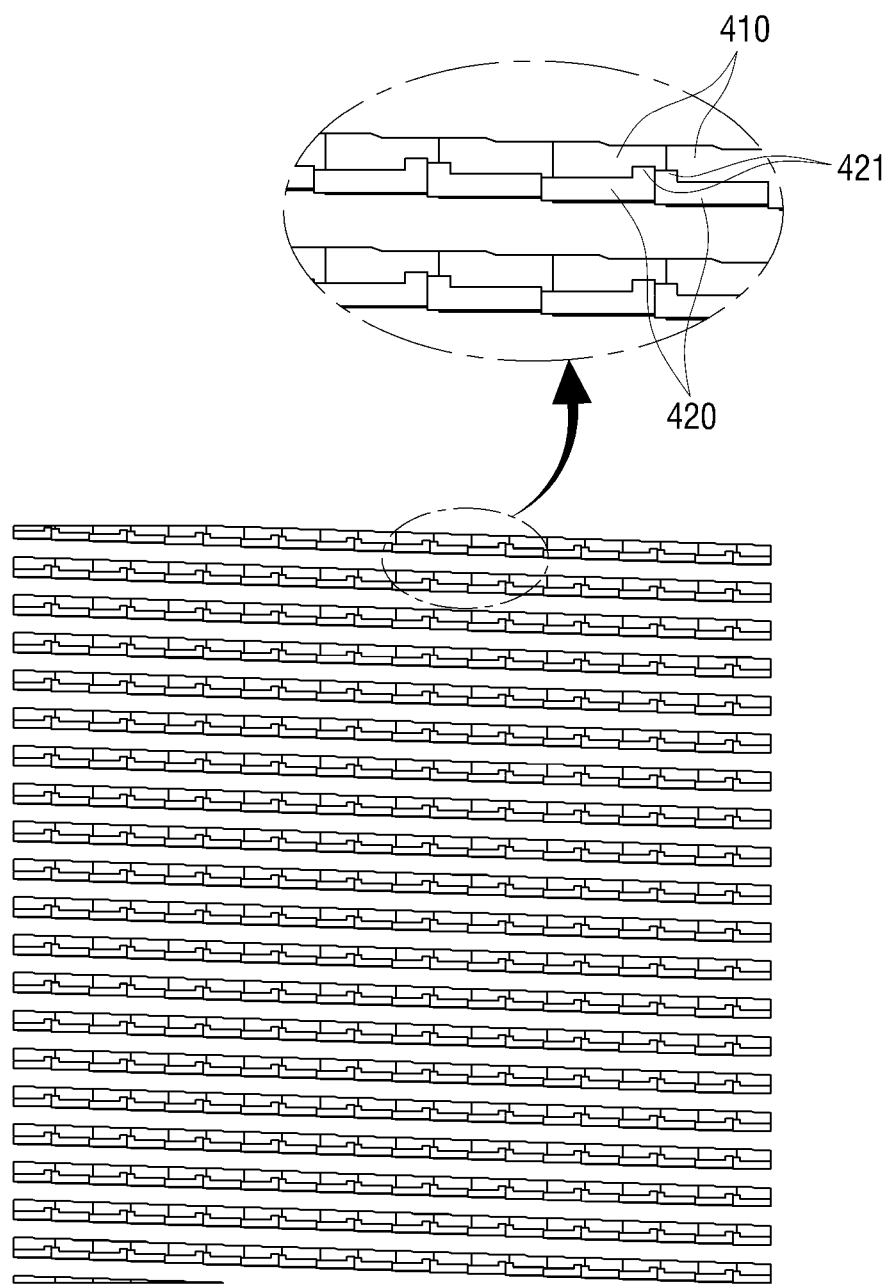
FIG. 14 is a schematic view showing a plurality of first shields and a plurality of second shields according to the exemplary embodiment of the present disclosure.

In the exemplary embodiment of the present disclosure, as shown in FIG. 14, the upper end of each of the plurality of second shields 420 may be disposed below the upper end of the corresponding first shield among the plurality of first shields 410. It may be understood that, when the upper end of each of the plurality of second shields 420 is disposed above the upper end of the corresponding first shield among the plurality of first shields 410, the light to be obstructed may be relatively increased to reduce the light efficiency.

Further, similarly to the plurality of incident lenses 210, the plurality of exit lenses 310, and the plurality of first shields 410, the plurality of second shields 420 may be arranged to allow the horizontal rows to be inclined upward in the direction from the first edge portion 412 to the second edge portion 413 of the first shields 410. FIG. 14 shows a shape when the plurality of first shields 410 and the plurality of second shields 420 are viewed from the front of the second lens portion 300. Meanwhile, a part of the upper end of each of the plurality of second shields 420 may be formed to include a protrusion 421 that protrudes upward. The protrusion 421 may prevent the occurrence of glare to the driver of the vehicle ahead.

In the above-described exemplary embodiment, the plurality of incident lenses 210, the plurality of exit lenses 310, the plurality of first shields 410, and the plurality of second shields 420 may be arranged to allow the horizontal rows to be inclined upward in the direction from the first edge portion 412 to the second edge portion 413 of the first shields 410. Since the first edge portion 412 forms the line CL2 of the cutoff line that corresponds to the driving lane, and the second edge portion 413 forms the line CL3 of the cutoff line that corresponds to the opposite lane, the plurality of incident lenses 210, the plurality of exit lenses 310, the plurality of first shields 410, and the plurality of second shields 420 may be arranged to allow the horizontal rows to be inclined upward in the direction from the opposite lane toward the driving lane.

As described above, according to the vehicle lamp 1 of the present disclosure, when the light generated from the light source portion 100 is incident on the plurality of incident lenses 210, and a beam pattern is formed by the light emitted through the plurality of exit lenses 310, by obstructing a part of the light incident on the plurality of exit lenses 310, the cutoff line may be prevented from being formed at an inappropriate position due to a height difference between the plurality of first shields 410 that form the cutoff line.

In concluding the detailed description, those skilled in the art will appreciate that many variations and modifications may be made to the exemplary embodiments without departing from the principles of the present disclosure. Therefore, the disclosed exemplary embodiments of the present disclosure are used in a general and descriptive sense only and not for purposes of limitation.

What is claimed is:

1. A lamp for a vehicle, comprising:
a light source portion;
a first lens portion including a plurality of incident lenses disposed on a surface on which light is incident from the light source portion;
a second lens portion including a plurality of exit lenses disposed on a surface from which light incident from the first lens portion is emitted; and
a shield portion disposed between the plurality of incident lenses and the plurality of exit lenses,
wherein at least one of the plurality of incident lenses and at least one of the plurality of exit lenses, which are disposed in a horizontal direction to form horizontal rows, are inclined at a predetermined angle with respect to a horizontal line such that an imaginary line that is drawn through a center of each lens in the horizontal direction is inclined with respect to the horizontal line.

2. The lamp of claim 1, wherein the horizontal rows of the plurality of incident lenses and the horizontal rows of the plurality of exit lenses are arranged along a vertical direction.

3. The lamp of claim 1, wherein the first lens portion includes a first light transmitting portion in which the plurality of incident lenses are disposed on the surface on which light is incident, and
wherein the second lens portion includes a second light transmitting portion in which the plurality of exit lenses are disposed on the surface from which light is emitted.

4. The lamp of claim 3, wherein facing surfaces of the first light transmitting portion and the second light transmitting portion abut each other.

5. The lamp of claim 3, wherein the shield portion includes a plurality of first shields formed on an incident surface of one of the first light transmitting portion and the second light transmitting portion, and
wherein the plurality of first shields are configured to obstruct a part of light incident on each of the plurality of exit lenses.

6. The lamp of claim 5, wherein horizontal rows of the plurality of first shields are inclined at a predetermined angle with respect to the horizontal line.

7. The lamp of claim 5, wherein each of the plurality of first shields includes:
an inclined edge portion;
a first edge portion having a height that corresponds to a lower end of the inclined edge portion; and
a second edge portion having a height that corresponds to an upper end of the inclined edge portion,
wherein the second edge portion of one of the plurality of first shields have a same height as the first edge portion of one adjacent first shield of the plurality of first shields disposed at one side of the one of the plurality of first shields along the horizontal row, and
wherein the first edge portion of the one of the plurality of first shields have a same height as the second edge portion of another adjacent first shield of the plurality of first shields disposed at the other side of the one of the plurality of first shields along the horizontal row.

8. The lamp of claim 7, wherein horizontal rows of the plurality of first shields are inclined upward with respect to the horizontal line in a direction from the first edge portion toward the second edge portion.

9. The lamp of claim 7, wherein the shield portion further includes a plurality of second shields formed on an exit surface of the one of the first light transmitting portion and the second light transmitting portion, and
wherein the plurality of second shields are configured to obstruct a part of light incident on each of the plurality of exit lenses.

10. The lamp of claim 9, wherein horizontal rows of the plurality of second shields are inclined upward with respect to the horizontal line in a direction from the first edge portion of the plurality of first shields toward the second edge portion of the plurality of first shields.

11. The lamp of claim 8, wherein the horizontal rows of the plurality of incident lenses and the horizontal rows of the plurality of exit lenses are inclined upward with respect to the horizontal line in a direction from the first edge portion toward the second edge portion.

12. The lamp of claim 5, wherein the shield portion further includes a plurality of second shields formed on an exit surface of the one of the first light transmitting portion and the second light transmitting portion, and
wherein the plurality of second shields are configured to obstruct a part of light incident on each of the plurality of exit lenses.

13. The lamp of claim 12, wherein horizontal rows of the plurality of second shields are inclined at a predetermined angle with respect to the horizontal line.

14. The lamp of claim 12, wherein an upper end of each of the plurality of second shields is disposed below an upper end of a corresponding first shield among the plurality of first shields.

15. The lamp of claim 12, wherein each of the plurality of second shields includes a protrusion that protrudes upward from an upper end thereof.

16. The lamp of claim 1, wherein each of the plurality of incident lenses is a semi-cylindrical lens that extends in the horizontal direction, and light emitted from the each of the plurality of incident lenses is incident on at least two of the plurality of exit lenses.

* * * * *